(12) United States Patent
Xu et al.

(10) Patent No.: US 12,528,190 B2
(45) Date of Patent: Jan. 20, 2026

(54) SYSTEMS AND METHODS FOR DEFORMABLE OBJECT MANIPULATION USING AIR

(71) Applicants: Toyota Research Institute, Inc., Los Altos, CA (US); Columbia University, New York, NY (US)

(72) Inventors: Zhenjia Xu, New York, NY (US); Cheng Chi, New York, NY (US); Benjamin Burchfiel, Somerville, MA (US); Eric Cousineau, Cambridge, MA (US); Siyuan Feng, Somerville, MA (US); Shuran Song, New York, NY (US)

(73) Assignees: TOYOTA RESEARCH INSTITUTE, INC., Los Altos, CA (US); TOYOTA JIDOSHA KABUSHIKI KAISHA, Toyota (JP); COLUMBIA UNIVERSITY, New York, NY (US)

( * ) Notice: Subject to any disclaimer, the term of this patent is extended or adjusted under 35 U.S.C. 154(b) by 319 days.

(21) Appl. No.: 18/167,584

(22) Filed: Feb. 10, 2023

(65) Prior Publication Data
US 2023/0256608 A1    Aug. 17, 2023

Related U.S. Application Data

(60) Provisional application No. 63/309,243, filed on Feb. 11, 2022.

(51) Int. Cl.
*B25J 9/16*    (2006.01)
*B25J 15/00*   (2006.01)

(52) U.S. Cl.
CPC .......... *B25J 9/1682* (2013.01); *B25J 9/1697* (2013.01); *B25J 15/0019* (2013.01)

(58) Field of Classification Search
CPC .... B25J 9/1682; B25J 9/1697; B25J 15/0019; B25J 9/0084; B25J 15/00;
(Continued)

(56) References Cited

U.S. PATENT DOCUMENTS 10,889,004 B2   1/2021   Lessing et al.
10,894,325 B2   1/2021   Bao et al.
(Continued)

FOREIGN PATENT DOCUMENTS

CN    206395025 U    8/2017
CN    111331607 A    6/2020
(Continued)

OTHER PUBLICATIONS

Seita, Daniel et al. "Deep Imitation Learning of Sequential Fabric Smoothing From an Algorithmic Supervisor." 2020 IEEE/RSJ International Conference on Intelligent Robots and Systems (IROS) (2019): 9651-9658. (Year: 2019).*
(Continued)

*Primary Examiner* — Thomas E Worden
(74) *Attorney, Agent, or Firm* — DINSMORE & SHOHL LLP

(57) ABSTRACT

Systems and methods for manipulating deformable objects using air are disclosed. In one embodiment, a system for manipulating a deformable object, the system includes a first robot arm having a first gripper, a second robot arm having a second gripper, a blower robot arm having an air pump, and one or more processors programmed to control the first robot arm and the second robot arm to grasp the deformable object using the first gripper and the second gripper, respectively, and to control the blower robot arm to perform a plurality of blowing actions onto the deformable object until an objective is satisfied.

16 Claims, 7 Drawing Sheets

(58) Field of Classification Search
CPC ........... G05B 2219/39109; G05B 2219/39116; G05B 2219/39123; G05B 2219/40607
See application file for complete search history.

(56) References Cited

U.S. PATENT DOCUMENTS

| | | | |
|---|---|---|---|
| 11,756,244 B1 * | 9/2023 | Bhunia | G06V 30/22 715/268 |
| 2019/0156486 A1 * | 5/2019 | Wang | G06N 3/045 |
| 2023/0158676 A1 * | 5/2023 | Sun | B25J 13/082 700/248 |

FOREIGN PATENT DOCUMENTS

| | | | | |
|---|---|---|---|---|
| CN | 113752249 A | | 12/2021 | |
| JP | H0627349 Y2 | | 7/1994 | |
| JP | 2001095348 A | | 4/2001 | |
| KR | 20190090743 | * | 8/2019 | |
| WO | WO-2015029143 A1 | * | 3/2015 | ............ B65B 35/16 |

OTHER PUBLICATIONS

KR-20190090743-A English translation (Year: 2019).*
WO-2015029143-A1 english translation (Year: 2015).*

* cited by examiner

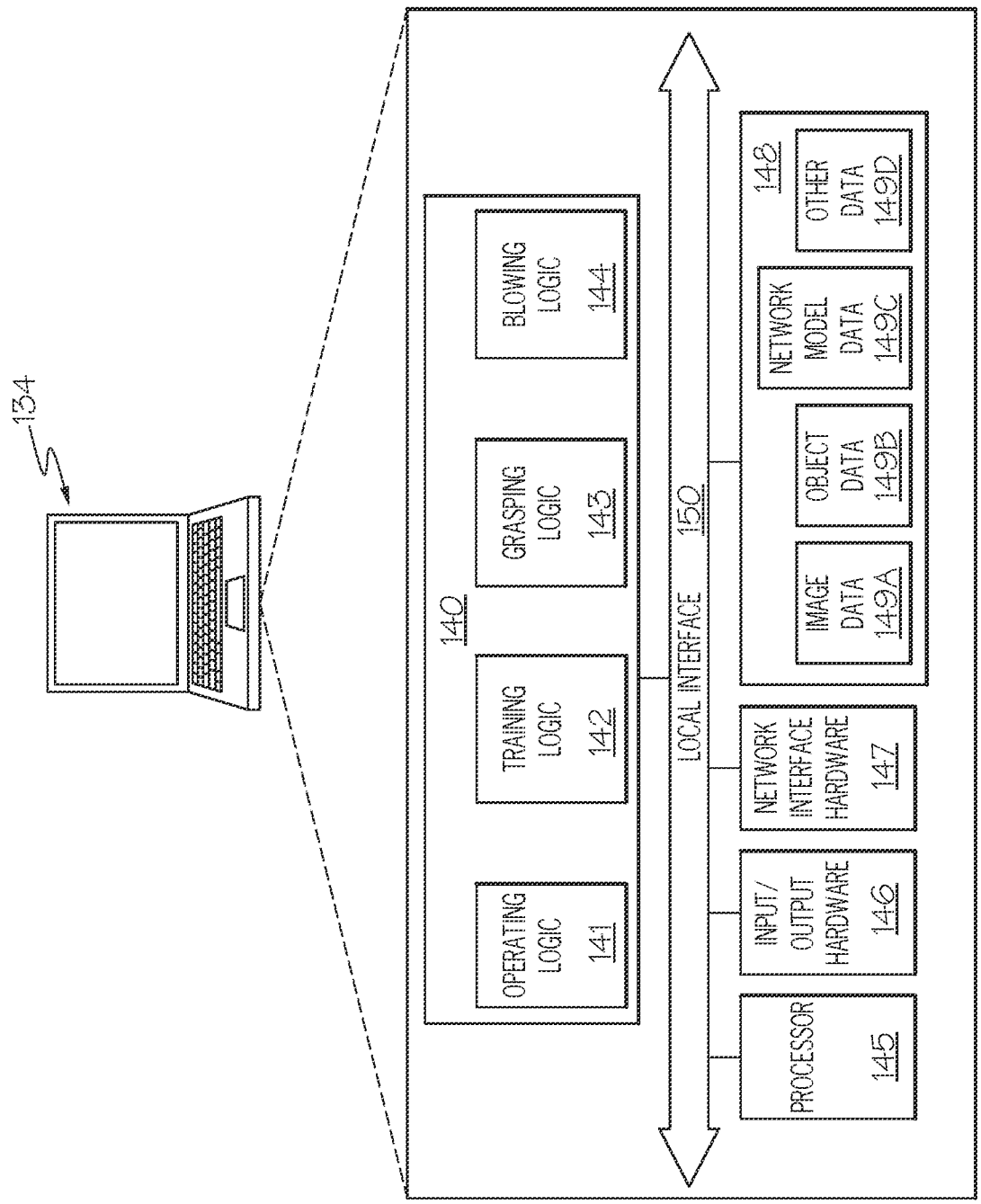

SYSTEMS AND METHODS FOR DEFORMABLE OBJECT MANIPULATION USING AIR

CROSS-REFERENCE TO RELATED APPLICATIONS

The present application claims priority to U.S. Provisional Patent Application 63/309,243 filed on Feb. 11, 2022 and entitled "DextAIRity: Deformable Manipulation Can be a Breeze," which is hereby incorporated by reference in its entirety.

BACKGROUND

Many objects around us are impractical to manipulate via direct contact; however, such objects can be manipulated indirectly via air. From blowing leaves on the street to inflating a molten glass, humans purposefully create and control airflow as a means to effectively change the state of objects (e.g., their position or shape).

Despite the potential advantages of airflow-based manipulation of objects, such as deformable objects, effectively utilizing airflow for object manipulation is a challenging task due to several factors: first, precisely modeling the complex aerodynamics between the airflow and a complex and dynamic environment is computationally costly, making model-based approaches impractical. Second, the precise parameters of the airflow (e.g., shape or volume) are not directly observable and typically hard to control with standard hardware, which often results in high action noise and unexpected action effects.

Accordingly, a need exists for alternative systems and methods for manipulating deformable objects may be desired.

SUMMARY

In one embodiment, a system for manipulating a deformable object, the system includes a first robot arm having a first gripper, a second robot arm having a second gripper, a blower robot arm having an air pump, and one or more processors programmed to control the first robot arm and the second robot arm to grasp the deformable object using the first gripper and the second gripper, respectively, and to control the blower robot arm to perform a plurality of blowing actions onto the deformable object until an objective is satisfied.

In another embodiment, a method for manipulating a deformable object includes grasping the deformable object at a first point and a second point using a first gripper of a first robot arm and a second gripper of a second robot arm, respectively, and blowing air toward the deformable object using an air pump of a blower robot arm controlled to perform a plurality of blowing actions until an objective is satisfied.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 7 illustrates an example computing device for controlling the robot arms of the system of FIG. 1 to perform the functionalities described herein.

DETAILED DESCRIPTION

Figure 1:
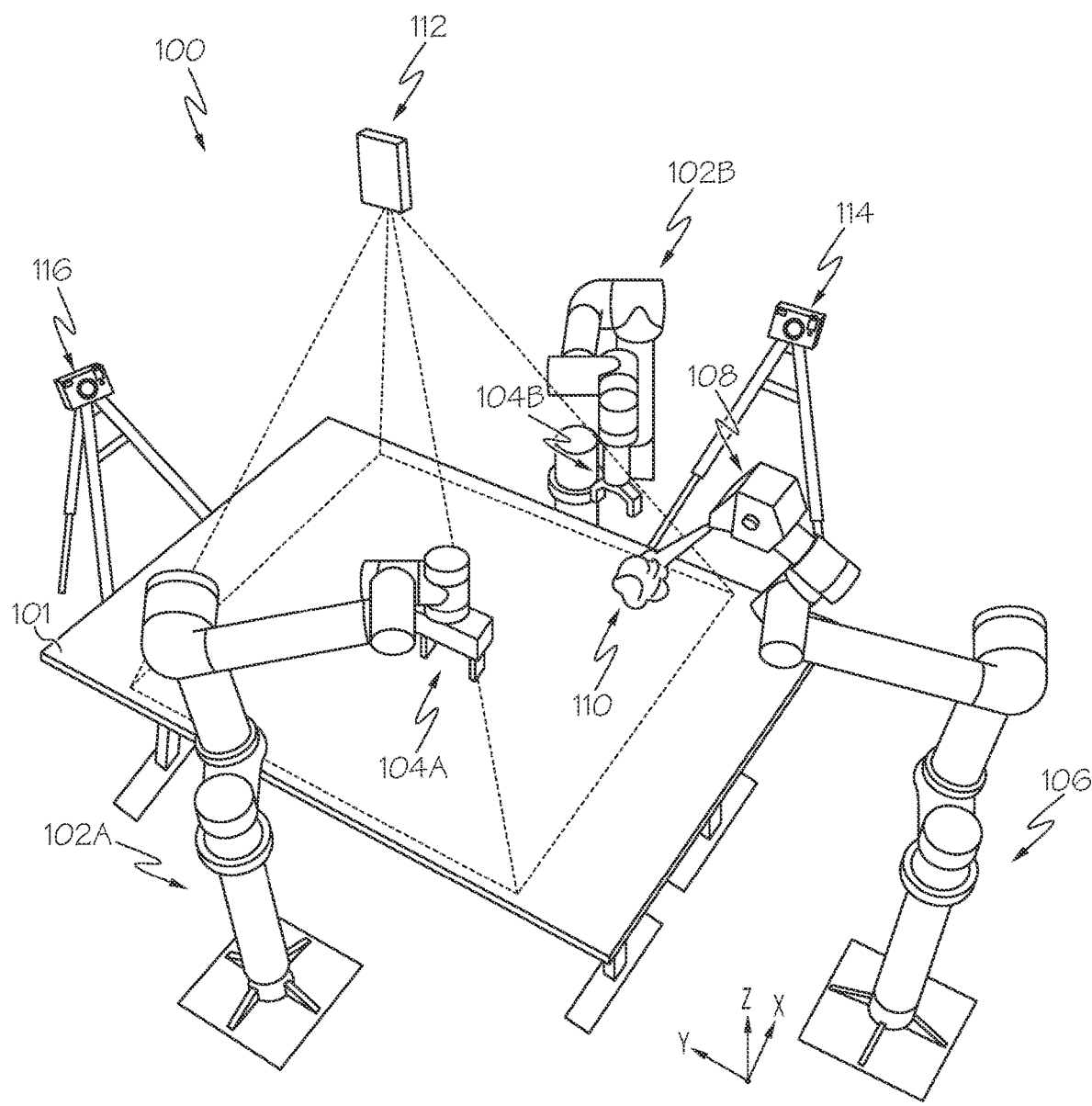
FIG. 1 illustrates a perspective view of an example system for manipulating a deformable object according to one or more embodiments described and illustrated herein.

Embodiments of the present disclosure are directed to systems and methods to manipulate deformable objects by utilizing active airflow. In contrast to conventional contact-based quasi-static manipulations, embodiments allow dense forces to be applied on out-of-contact surfaces, expand the system's reach range, and provide high-speed interactions. All these properties offer a set of unique advantages when handling under-actuated deformable objects with large surface areas or volume.

Embodiments employ a self-supervised learning framework that learns to perform a target task through a sequence of grasping or blowing actions. By using a close-loop formulation for blowing, embodiments continually adjusts a blowing direction based on visual feedback to handle high action noise caused by the complex dynamics. The algorithm of the present disclosure is provided on a real-world three-arm robotic system. Embodiments can improve the efficiency for challenging manipulation tasks (e.g., cloth unfolding) and enable new applications that were not possible with quasi-static contact-based manipulations (e.g., bag opening).

As a form of pneumatic dynamic manipulation, the systems and methods described herein provide a set of unique advantages over conventional contact-based quasi-static manipulations. Particularly, embodiments provide for dense force application. Instead of applying force through sparse contact positions, embodiments of the present disclosure allow simultaneous application of forces in a three-dimensional space and production of large and compliant contact patches via air pressure. This property is particularly beneficial for under-actuated objects—including deformable objects—because it allows the robotic system to apply forces over those out-of-contact surfaces. As a result, systems which are under-actuated with contact-based manipulation can become more actuated when manipulated using streams of air.

Embodiments also provide for an expanded work space. Because the systems and methods described herein do not require direct contact to manipulate objects, forces can be applied on objects that are distant from the robot using high-velocity air flows (e.g., blowing). As a result, the systems and methods can effectively expand its workspace and manipulating object beyond the maximum reach range of the robot. This property is useful when the target object has a large volume or surface area (e.g., spreading a large piece of cloth).

As described in more detail below, embodiments employ a self-supervised closed-loop solution for manipulating deformable objects. When airflow is applied to deformable cloth, the deformation on the cloth provides the state information of the unobservable airflow. By combining this information with the closed-loop control, the system is able to continually adjust its blowing action based on its visual feedback. Finally, because the supervision signal for the learning algorithm can be directly computed from the visual observation, the system can be fully trained with self-supervised trial-and-error, without any human demonstration or annotation. The present application provides two use-case examples, cloth unfolding and bag opening, where the objective is to increase cloth coverage and bag volume, respectively (i.e., maximize surface area). However, it should be understood that embodiments are not limited to these deformable objects and tasks.

Referring now to FIG. 1, an example system 100 for manipulating deformable objects is illustrated. The system 100 generally comprises two gripping robots in the form of a first robot arm 102A having a first gripper 104A and a second robot arm 102B having a second gripper 104B. Embodiments are not limited by the type of robot arms and grippers that are used. As a non-limiting example, the first robot arm 102A and the second robot arm 102B may be UR5 robots sold by Universal Robots of Odense, Denmark, and the first gripper 104A and the second gripper 104B parallel-jaw grippers such as the WSG50 gripper sold by Schunk of Lauffen/Neckar, Germany and/or the RG2 gripper sold by OnRobot of Odense, Denmark.

The system 100 further comprises a blower robot arm 106 having an air pump 108 capable of producing a stream of air 110. The blower robot arm 106 may be the same or different from the type of robot of the first robot arm 102A and the second robot arm 102B. As a non-limiting example, the air pump 108 is able to produce on-demand streams of focused air 110 with a maximum flow rate of 1100 L/s. In some embodiments one or more image sensors may be included to provide for closed-loop control. In the illustrated example, the system 100 includes a first image sensor 112 having atop down view, a second image sensor 114 having a side view, and a third image sensor 116 having a front view.

The three robot arms and the three image sensors are situated about a work surface 101. Particularly, the first robot arm 102A and the second robot arm 102B are offset from one another along a first axis (i.e., the x-axis) such that they are on opposite sides of the work surface 101. The blower robot arm 106 is offset from each of the first robot arm 102A and the second robot arm 102B along two axes (i.e., the x-axis and the y-axis) such that the blower robot arm 106 is positioned along an edge of the work surface 101 that is different from that of a first robot arm 102A and the second robot arm 102B. Thus, the first robot arm 102A, the second robot arm 102B and the blower robot arm 106 are in a triangular orientation.

Figure 2:
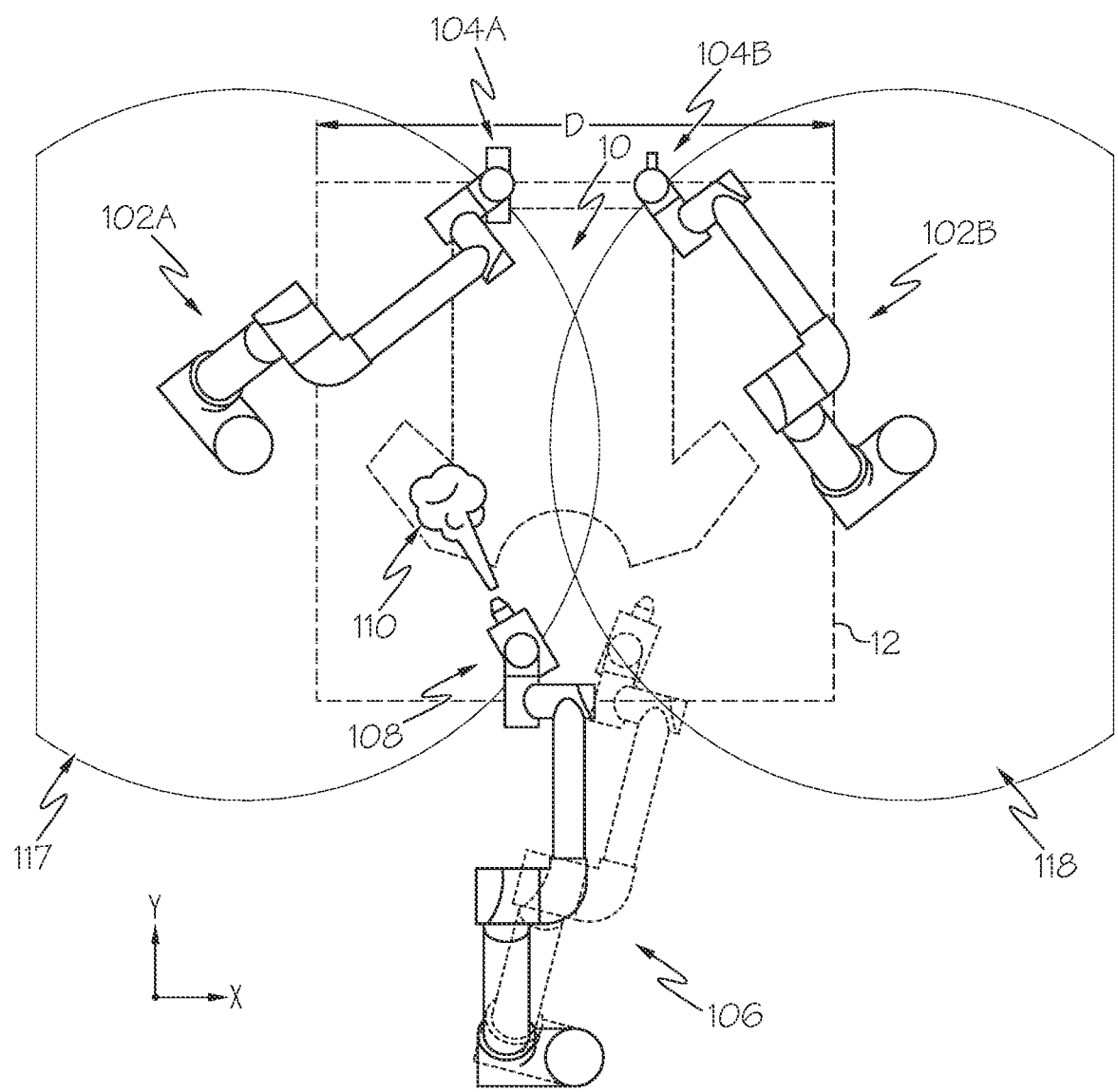
FIG. 2 illustrates a top-down view of the example system of FIG. 1 unfolding a deformable object according to one or more embodiments described and illustrated herein.

FIG. 2 illustrates a top-down view of the system 100, and shows the reach range 117 of the first robot arm 102A and the reach range 118 of the second robot arm 102B for an unfolding task that unfolds a fabric, such as an article of clothing. A workspace 12 is defined by a D×D square in an x-y plane. For the UR5 robots, the workspace 12 is a 1.1 m×1.1 square. As described in more detail below, a crumpled cloth is randomly dropped in the workspace 12. Given a reach range for each of the first robot arm 102A and the second robot arm 102B, neither robot arm can cover the workspace 12 of a fully unfolded cloth. To perform the unfolding task, the algorithm first infers parameters for both grasping and blowing from a top-down image observation.

Figure 3:
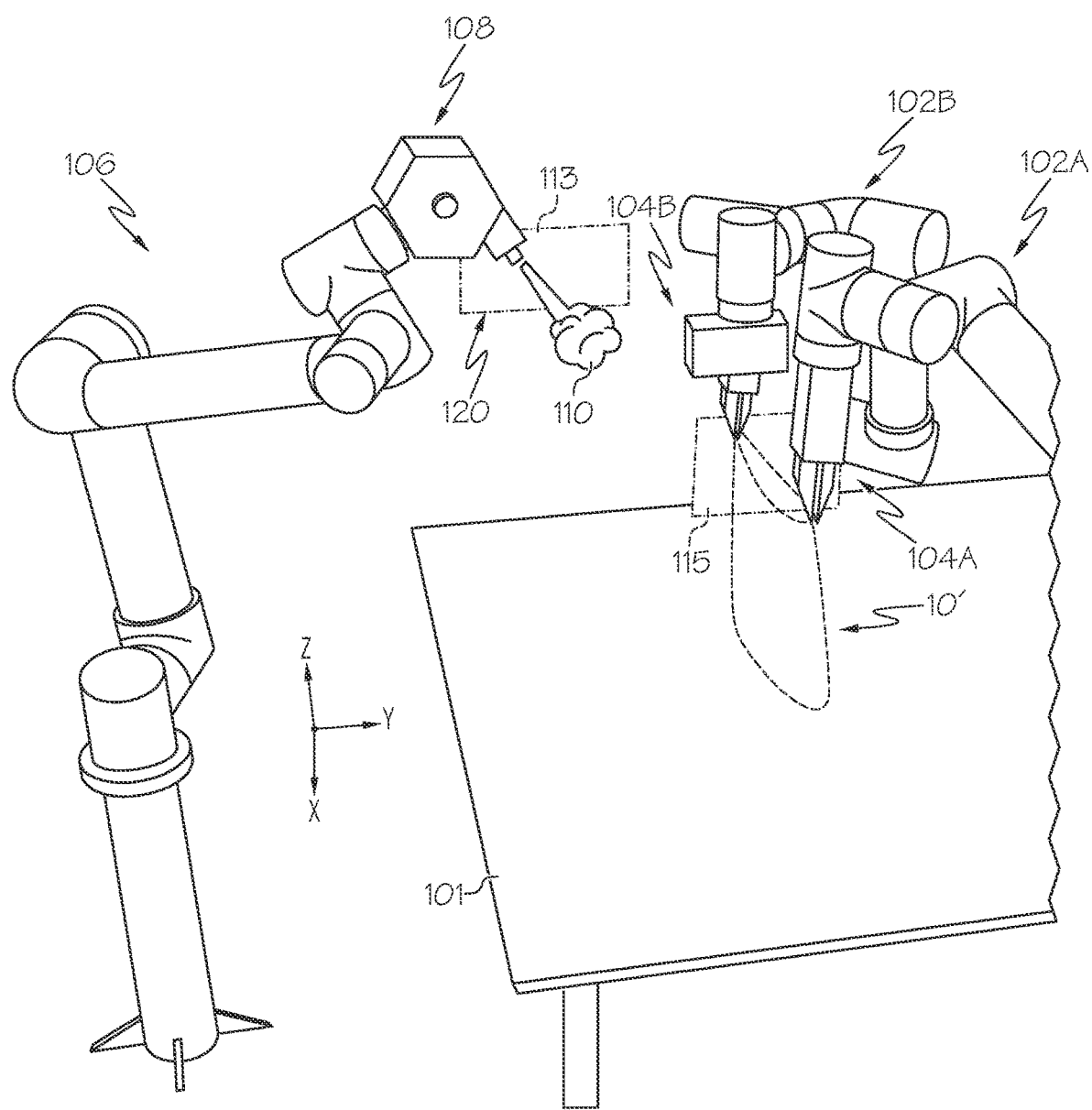
FIG. 3 illustrates a perspective view of the example system of FIG. 1 opening a bag according to one or more embodiments described and illustrated herein.

FIG. 3 illustrates a perspective view of the system 100 where the task objective is opening a bag 10' and maintain its opening state. The bag opening state is determined by thresholding the surface area of the bag observed by the side-view image sensor 114, wherein the threshold is selected for each bag to accommodate different bag sizes. This task would simplify downstream applications, such as placing objects into a bag. In this task, it is assumed that the bag 10' is already picked up by the first robot arm 102A and the second robot arm 102B, and its position in y-z plane is randomly sampled in a region 115 (e.g., a 0.2 m×0.14 m rectangle). Similar to the unfolding task, the policy infers blowing actions from top-down images of the bag 10' in a closed-loop manner. As a non-limiting example, up to four blowing actions can be executed until the bag 10' is opened or the opening session will be considered as a failure.

The system 100 leverages the interactions between active airflow and the deformable object 10 to achieve efficient manipulation. On one hand, airflow provides the system 100 with additional controls over the out-of-contact positions on the deformable object 10. On the other hand, the deformation on the deformable object 10 also provides visual feedback of the unobservable airflow, allowing the system 100 to continually adjust its action in a closed-loop manner.

Figure 4:
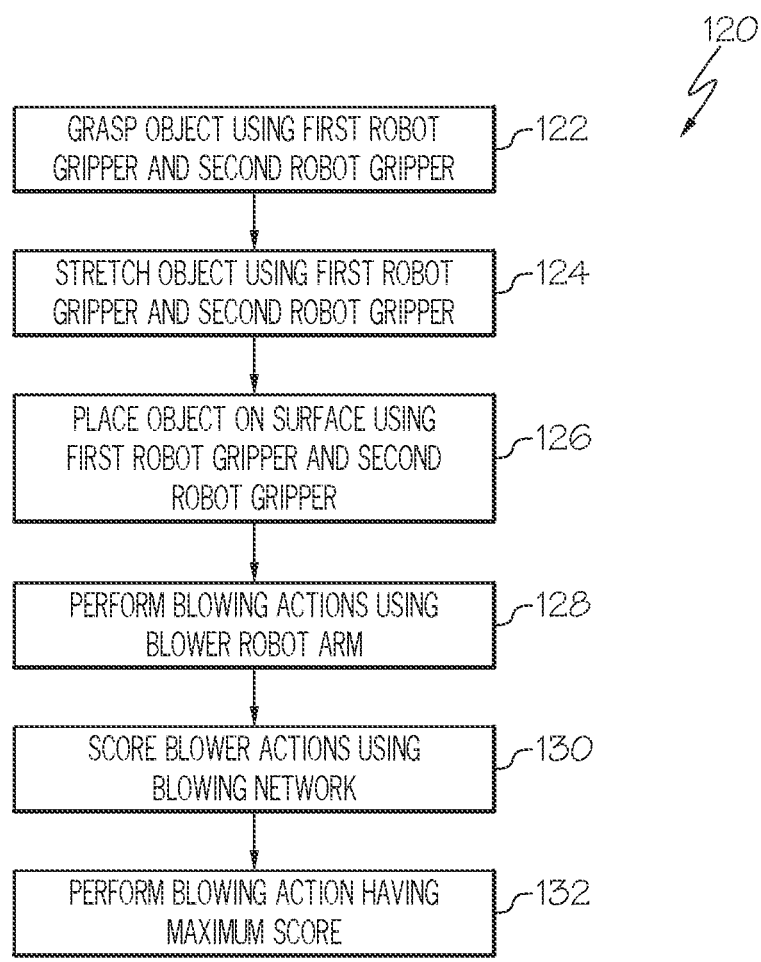
FIG. 4 illustrates a flowchart for an example method of manipulating a deformable object using robot arms and an air pump according to one or more embodiments described and illustrated herein.
Figure 5A:
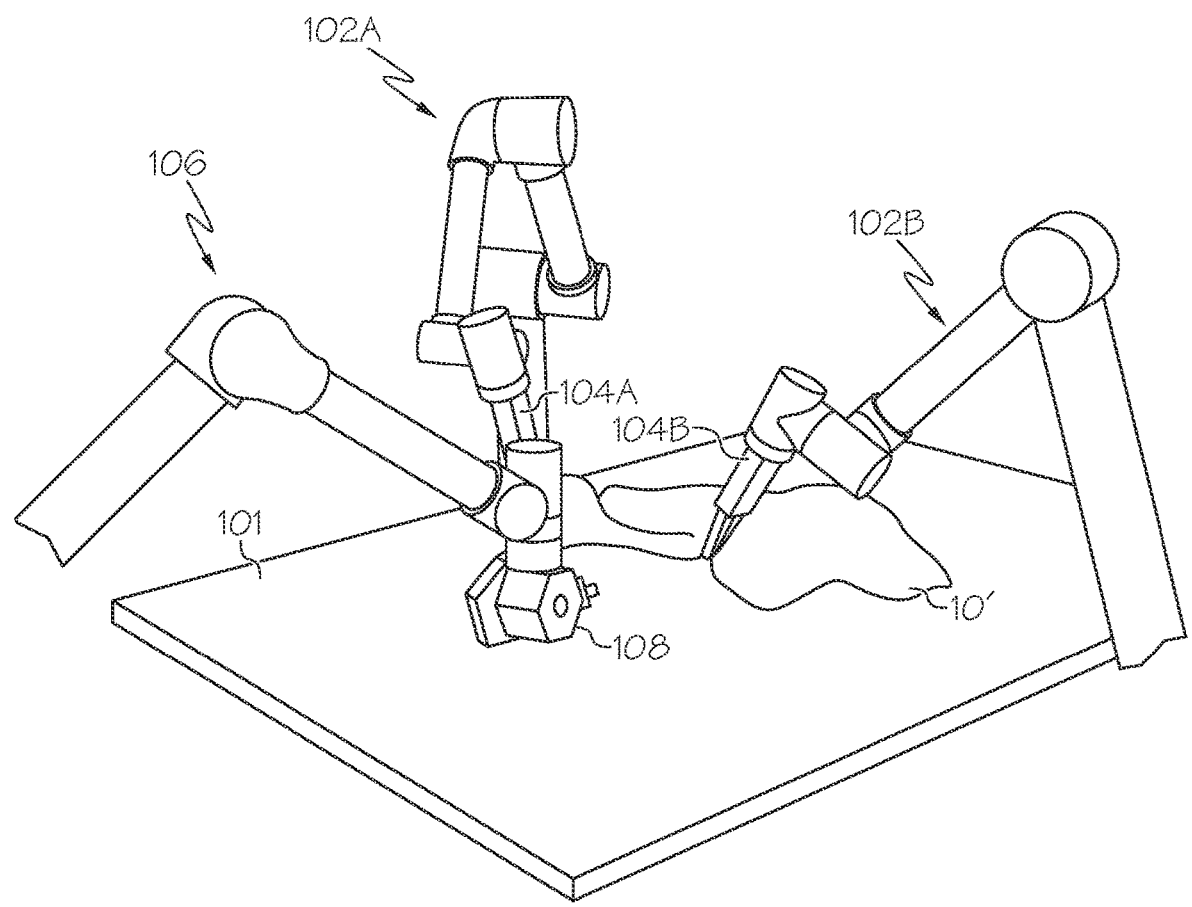
FIG. 5A illustrates a perspective view of the system of FIG. 1 in the process of unfolding a t-shirt according to one or more embodiments described and illustrated herein.
Figure 5B:
FIG. 5B illustrates the t-shirt of FIG. 5A in an initial, crumpled state.

Referring now to FIG. 4, a flowchart 120 illustrating an example method of manipulating a deformable object is provided. The deformable object may be fabric, such as an article of clothing, or a bag, for example. At block 122 the deformable object is grasped using the first gripper 104A and the second gripper 104B. FIG. 5B illustrates an example deformable object 10 as a t-shirt that is randomly dropped into the workspace 12. Any method of trajectory planning may be used to generate a trajectory to optimally grasp the deformable object. In an example approach, dual-arm grasp action is parameterized by a center point of the deformable object, the angle and width between two grasps positions. This parameterization allows the algorithm to compute the left and right grasp positions while satisfying the collision-free constraints. On top of this formulation, the grasp position are further constrained to be on the edges of the cloth. This constraint can significantly reduce the chance of grasping multiple layers of the fabric, which is a typical failure case. To add this constraint, rather than using a grasp width prediction, the method treats the center prediction as a pivot point P=(x, y) for the rotation angle θ. With these two parameters, a line of possible grasping positions in a two-dimensional plane can be determined. Then two furthest points falling on the object will be selected to form an edge-coincided grasping action. The grasp position in the z-axis is determined by depth. The object is segmented using background subtraction. If the pivot point falls in the background or the distance between two grasping positions is smaller than the minimum safe distance (e.g., 0.1 m), no grasp will be executed, and the episode will terminate with a state reset.

To infer the grasping parameters, a spatial action map may be employed to leverage the transitional and rotational equivariances between the actions and the physical transformations of the cloth. The top-down color image provided by the first image sensor 112 is first rotated eight times before fed into the grasping network, which then predicts the grasping score for each pixel, indicating the cloth coverage after execution. As a result, a pixel P in the image rotated by the rotation angle θ directly maps to a grasping action with pivot point equals to P and rotation equals to the rotation angle θ. Finally, the pixel associated with the highest score is selected for execution. As a non-limiting example, the DeepLabv3 without pretraining may be used as the network architecture.

Next, at block 124, the deformable object is stretched out by moving the first robot arm 102A and the second robot arm 102B is opposing directions. The third image sensor 116 providing a front view detects the banding angles of the deformable object's top edge. At block 126 the robot places the end of the deformable object that is opposite from the gripped end of the deformable object. The system 100 may do this by controlling the first robot arm 102A and the second robot arm 102B toward the blower robot arm 106 while also lowering the deformable object toward the surface 101 such that the grasped end is a predetermined distance above the surface 101 (e.g., 10 cm). FIG. 5A illustrates a deformable object 10 in the form of a cloth t-shirt where the end of the t-shirt opposite from the end grasped by the first gripper 104A and the second gripper 104B is placed on the surface 101.

At block 128, a plurality of blowing actions are performed on the deformable object using the blower robot arm 106 and associated air pump 108 according to a closed-loop blowing policy. The air pump 108 starts an initial blowing facing towards the center of the workspace 12 (see FIG. 2), and then the blower robot arm 106 adjusts its pose based on the blowing policy in a closed-loop manner.

The blowing action is parametrized by its position $(p_x, r_z)$, where $p_x \in [-1,1]$ represents translation in the x-axis (i.e., moving left and right) and its orientation $r_z \in [-30,30]$, where $r_z$ is a rotation angle along the z-axis (i.e., facing left and right). Other blower parameters are fixed during the interaction—the blower's nozzle is a certain distance above the surface 101 (e.g., 0.03 m) and a certain distance away from the holding position of the first gripper 104A and the second gripper 104B (e.g., 0.05 m) with a pitch angle facing slightly downward (e.g., −10°).

Figure 5C:
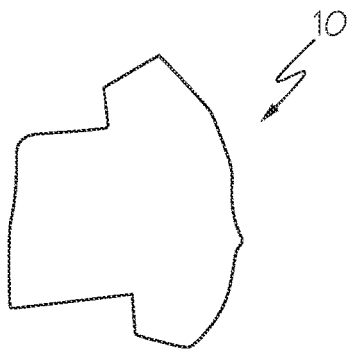
FIG. 5C illustrates the t-shirt of FIG. 5A after being unfolded by the system of FIG. 5A according to one or more embodiments described and illustrated herein.

To infer effective blowing actions, a trained blowing network takes a top-down color image from the first image sensor 112 and a blowing action (i.e., the air pump position and orientation) as input, and infers a score (i.e., coverage after execution) for that action. At each step, M=64 blowing action candidates are sampled to evaluate and pick the action candidate associated with a maximum score to execute. The blowing network may comprise an image encoder (e.g., a seven-layer convolution neural network) and an action encoder (e.g., a three-layer multilayer perceptron (MLP)), followed by a three-layer MLP to produce the final score (block 130). The blowing action having the highest score is selected and performed at block 132 to unfold the deformable object. FIG. 5C illustrates the t-shirt (i.e., deformable object 10) as unfolded by the method described by FIG. 4.

In embodiments, both the grasping and the blowing network are trained using self-supervised trials-and-errors with epsilon-greedy for exploration. In each training episode, five grasping actions are executed and each of them is followed by four blowing actions. Each blowing action is labeled with the coverage of the deformable object (e.g., cloth) after execution, while each grasping step is labeled with the coverage after the following four blowing actions executed. To compute coverage, cloth mask is obtained via background subtraction. Both networks are supervised on the mean-squared error loss of the predicted and real coverage.

It is noted that the performance of two modules are highly entangled—grasping score is dependent on the following blowing steps, and blowing performance is also affected by how the cloth is grasped. This entanglement can make training unstable. To solve this issue, a simple heuristic policy was designed for grasping and blowing to allow independent training for each module before combining them for further fine-tuning. The example heuristic blowing policy is to place the blower in the middle and always face forward. This heuristic policy can unfold most of the cloth, but may miss some corners. As to the heuristic grasping policy, 100 grasping position pairs falling on the cloth are randomly sampled and the position pair with the largest distance is selected as the grasping action. Both pre-trained and fine-tuning happens in simulation, which takes 300 and 200 epochs respectively. Each epoch contains 32 episodes and 64 optimization steps with a batch size of 16 for the grasping network and 128 for the blowing network. Two first-in, first-out replay buffers (size=3000) are used to store training data. Both networks are trained using the Adam optimizer with a learning rate of 1e-4 and a weight decay of 1e-6.

The method of the flowchart 120 of FIG. 4 can be modified to perform other tasks, such as opening a bag 10'. In the bag opening task, it is assembled that the bag is already lifted up at a random position and the algorithm only need to infer the blowing actions. The grasping range of the first robot arm 102A and the second robot arm 102B is illustrated by region 115 of FIG. 3. The same blowing network architecture as in the unfolding task can be used, but with a few modifications in action parameterization, reward signal, and directly training this policy on real-world data.

The blowing action is parameterized by where $(p_y, p_z)$ represents the air pump's position in y-z plane (region 113 in FIG. 3), while $r_x$ controls the air pump's pitch angle. The reward (i.e., binary opening state) is computed by thresholding the surface area of the bag observed by the side-view camera. The threshold is computed for each bag to accommodate different bag sizes. Binary reward was used for training, since for this task the bags seldom stay at an intermediate state (e.g., half-open), and a binary reward is much more data-efficient for training. To reduce the noise in reward computation, at each blowing step, the air pump 108 turns on for a short period of time (e.g., two seconds) after arrival to ensure the bag 10' is in a relatively stable state. Then, a plurality of images will be captured by the side camera in the time period (e.g., 20 fps, 400 images for the time period of two seconds). The blowing network is trained with data collected by real-world robots. Random policy is used in data collection.

Figure 6A:
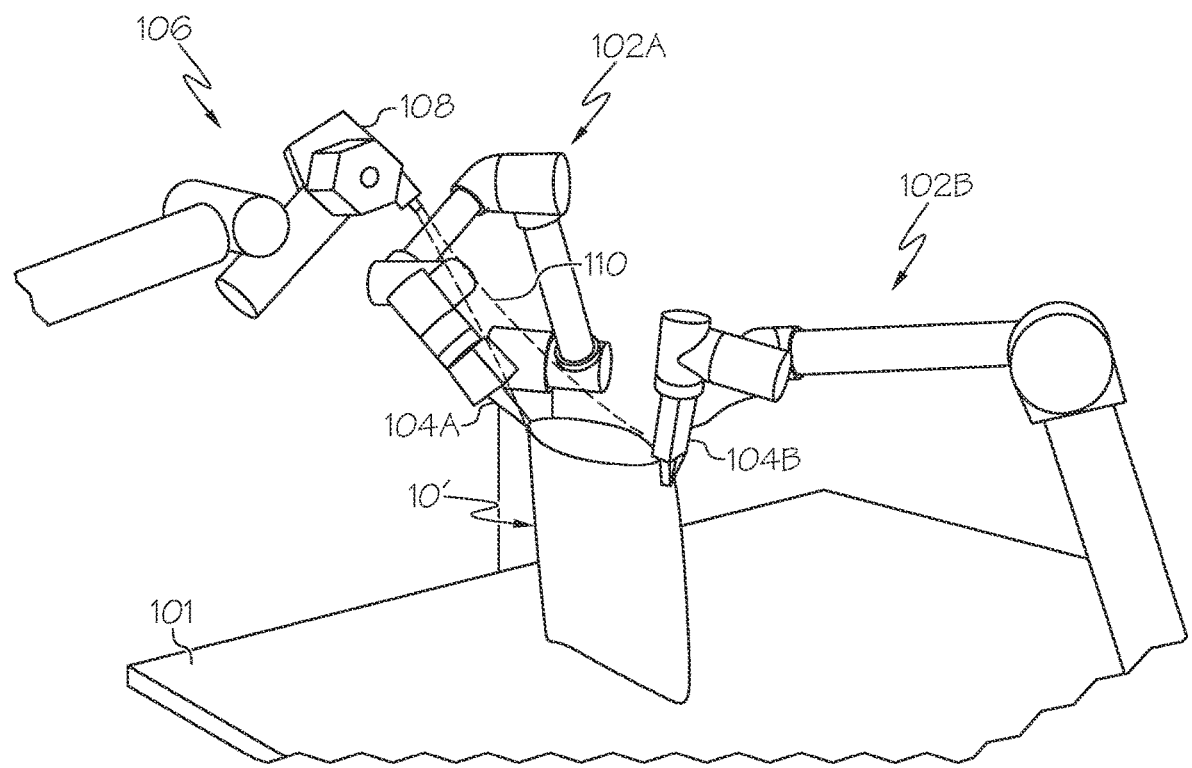
FIG. 6A illustrates a perspective view of the system of FIG. 1 in the process of opening a bag according to one or more embodiments described and illustrated herein.
Figure 6B:
FIG. 6B illustrates the bag of FIG. 6A in an initial, unopened state.
Figure 6C:
FIG. 6C illustrates the bag of FIG. 6A after being opened by the system of FIG. 6A according to one or more embodiments described and illustrated herein.

FIG. 6A illustrates the system 100 in the process of opening a bag 10' that started at an initial closed state as shown in FIG. 6B, and results in an open state as shown in FIG. 6C.

Embodiments of the present disclosure may include a computing device programmed to control robots to perform the functionalities described herein. Referring now to FIG. 7 an example computing device 134 is schematically illustrated. The example computing device 134 provides functionality for manipulating a deformable object, and/or a non-transitory computer usable medium having computer readable program code for controlling robots to manipulate a deformable object embodied as hardware, software, and/or firmware, according to embodiments shown and described herein. While in some embodiments, the computing device 134 may be configured as a general purpose computer with the requisite hardware, software, and/or firmware, in some embodiments, the computing device 134 may be configured as a special purpose computer designed specifically for performing the functionality described herein. It should be understood that the software, hardware, and/or firmware components depicted in FIG. 7 may also be provided in other computing devices external to the computing device 134 (e.g., data storage devices, remote server computing devices, and the like).

As also illustrated in FIG. 7, the computing device 134 (or other additional computing devices) may include a processor 145, input/output hardware 146, network interface hardware 147, a data storage component 148 (which may include image data 149A (e.g., image data generated by the one or more image sensors), object data 149B (e.g., any data relating to the particular object being manipulated, such as object type, shape, size and/or the like), network model data 149C (e.g., any data relating to the trained models described herein) and any other data 149D for performing the functionalities described herein), and a non-transitory memory component 140. The memory component 140 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 140 may be configured to store operating logic 141, training logic 142 for training the models described herein, grasping logic 143 for controlling the robot arms to grasp a deformable object, and blowing logic 144 for controlling a blower robot arm for manipulating a deformable object using air (each of which may be embodied as computer readable program code, firmware, or hardware, as an example). It should be understood that the data storage component 148 may reside local to and/or remote from the computing device 134, and may be configured to store one or more pieces of data for access by the computing device 134 and/or other components.

A local interface 150 is also included in FIG. 7 and may be implemented as a bus or other interface to facilitate communication among the components of the computing device 134.

The processor 145 may include any processing component configured to receive and execute computer readable code instructions (such as from the data storage component 148 and/or memory component 140). The input/output hardware 146 may include a graphics display device, keyboard, mouse, printer, camera, microphone, speaker, touch-screen, and/or other device for receiving, sending, and/or presenting data. The network interface hardware 147 may include any wired or wireless networking hardware, such as a modem, LAN port, wireless fidelity (Wi-Fi) card, WiMax card, mobile communications hardware, and/or other hardware for communicating with other networks and/or devices.

Included in the memory component 140 may be the operating logic 141, training logic 142, grasping logic 143, and blowing logic 144. The operating logic 141 may include an operating system and/or other software for managing components of the computing device 134. Similarly, the training logic 142 may reside in the memory component 140 and may be configured to train the grasping and blowing network models described herein. The grasping logic 143 also may reside in the memory component 140 and may be configured to control the first robot arm and the second robot arm to grasp a deformable object. The blowing logic 144 includes logic to control the blower robot arm to blow air to manipulate the deformable object.

The components illustrated in FIG. 7 are merely exemplary and are not intended to limit the scope of this disclosure. More specifically, while the components in FIG. 7 are illustrated as residing within the computing device 134, this is a non-limiting example. In some embodiments, one or more of the components may reside external to the computing device 134.

It should now be understood that embodiments of the present disclosure are directed to systems and methods for manipulating deformable objects using robot arms and air. More particularly, embodiments provide systems and methods for deformable object manipulation by utilizing active airflow that can improve the system efficiency for challenging manipulation tasks (e.g., cloth unfolding) and enable new applications that were not possible with quasi-static contact-based manipulations (e.g., bag opening).

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A system for manipulating a deformable object, the system comprising:
    a first robot arm having a first gripper;
    a second robot arm having a second gripper;
    a blower robot arm having an air pump;
    at least one image sensor; and
    one or more processors programmed to:
        control the first robot arm and the second robot arm to grasp the deformable object using the first gripper and the second gripper, respectively;
        control the blower robot arm to perform a plurality of blowing actions onto the deformable object;
        score individual blowing actions of the plurality of blowing actions using the image data as input into a trained blowing network comprising an image encoder in the form of a convolution neural network and an action encoder in the form of a multilayer perceptron;
        select a selected blowing action having a maximum score among the plurality of blowing actions; and
        repeatedly perform the selected blowing action until an objective is satisfied.

2. The system of claim 1, wherein the one or more processors are further programmed to position the deformable object at a distance above a surface.

3. The system of claim 1, wherein:
the first robot arm and the second robot arm are secured to a surface such that they are offset from one another along a first axis; and
the blower robot arm is secured to the surface such that it is offset from each of the first robot arm and the second robot arm along two axes.

4. The system of claim 1, wherein the at least one image sensor comprises a first image sensor having a top-down view of the deformable object, a second image sensor having a side-view of the deformable object, and a third image sensor having a front-view of the deformable object.

5. The system of claim 1, wherein the objective is a maximum surface area of the deformable object.

6. The system of claim 1, wherein the deformable object is a bag, and the objective is a maximum surface area of a side of the bag.

7. The system of claim 1, wherein the deformable object is an article of clothing and the one or more processors are further programmed to:
lift the article of clothing to a first predetermined distance from a surface; and
move a gripped end of the article of clothing toward the blower robot arm.

8. The system of claim 7, wherein the one or more processors are further programmed to lower the deformable object to second predetermined distance such that an end of the article of clothing opposite from the gripped end of the article of clothing contacts the surface.

9. A method for manipulating a deformable object, the method comprising:
grasping the deformable object at a first point and a second point using a first gripper of a first robot arm and a second gripper of a second robot arm, respectively;
blowing air toward the deformable object using an air pump of a blower robot arm controlled to perform a plurality of blowing actions;
monitoring a shape of the deformable object using an image sensor that produces image data;
scoring individual blowing actions of the plurality of blowing actions using the image data as input into a trained blowing network comprising an image encoder in the form of a convolution neural network and an action encoder in the form of a multilayer perceptron;
selecting a selected blowing action having a maximum score among the plurality of blowing actions; and
repeatedly performing the selected blowing action until an objective is satisfied.

10. The method of claim 9, further comprising positioning the deformable object at a distance above a surface.

11. The method of claim 9, wherein:
the first robot arm and the second robot arm are secured to a surface such that they are offset from one another along a first axis; and
the blower robot arm is secured to the surface such that it is offset from each of the first robot arm and the second robot arm along two axes.

12. The method of claim 9, wherein the at least one image sensor comprises a first image sensor having a top-down view of the deformable object, a second image sensor having a side-view of the deformable object, and a third image sensor having a front-view of the deformable object.

13. The method of claim 9, wherein the objective is a maximum surface area of the deformable object.

14. The method of claim 9, wherein the deformable object is a bag, and the objective is a maximum surface area of a side of the bag.

15. The method of claim 9, wherein the deformable object is an article of clothing and the method further comprises:
lifting the article of clothing to a first predetermined distance from a surface; and
moving a gripped end of the article of clothing toward the blower robot arm.

16. The method of claim 15, wherein the method further comprises lowering the deformable object to second predetermined distance such that an end of the article of clothing opposite from the gripped end of the article of clothing contacts the surface.

* * * * *